(12) United States Patent
Ohkoshi et al.

(10) Patent No.: US 9,916,922 B2
(45) Date of Patent: Mar. 13, 2018

(54) IRON OXIDE MAGNETIC NANOPARTICLE POWDER AND METHOD OF PRODUCING THE SAME, IRON OXIDE MAGNETIC NANOPARTICLE THIN FILM CONTAINING THE IRON OXIDE MAGNETIC NANOPARTICLE POWDER AND METHOD OF PRODUCING THE SAME

(71) Applicants: THE UNIVERSITY OF TOKYO, Tokyo (JP); DOWA ELECTRONICS MATERIALS CO., LTD., Tokyo (JP)

(72) Inventors: Shin-ichi Ohkoshi, Tokyo (JP); Marie Yoshikiyo, Tokyo (JP); Asuka Namai, Tokyo (JP); Hiroko Tokoro, Tokyo (JP); Waka Tarora, Tokyo (JP); Takayuki Yoshida, Tokyo (JP); Manabu Tanaka, Tokyo (JP)

(73) Assignees: The University of Tokyo, Tokyo (JP); Dowa Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 14/787,186

(22) PCT Filed: Apr. 24, 2014

(86) PCT No.: PCT/JP2014/061585
§ 371 (c)(1),
(2) Date: Oct. 26, 2015

(87) PCT Pub. No.: WO2014/175387
PCT Pub. Date: Oct. 30, 2014

(65) Prior Publication Data
US 2016/0104560 A1    Apr. 14, 2016

(30) Foreign Application Priority Data

Apr. 26, 2013 (JP) ................................ 2013-094467
Oct. 10, 2013 (JP) ................................ 2013-213154

(51) Int. Cl.
*H01F 1/03* (2006.01)
*C04B 35/26* (2006.01)
(Continued)

(52) U.S. Cl.
CPC ........... *H01F 1/0551* (2013.01); *C01G 49/06* (2013.01); *H01F 1/0054* (2013.01);
(Continued)

(58) Field of Classification Search
CPC ................................ H01F 1/03; C04B 35/26
(Continued)

(56) References Cited

FOREIGN PATENT DOCUMENTS

JP    2008-063199 A    3/2008
JP    2008-063200 A    3/2008
(Continued)

OTHER PUBLICATIONS

Bukhtiyarova. Facile synthesis of nanosized e-Fe2O3 particles on the silica support. J Nanopart Res (2011) 13:5527-5534.*
(Continued)

*Primary Examiner* — Matthew E Hoban
(74) *Attorney, Agent, or Firm* — Oliff PLC

(57) ABSTRACT

There is provided an iron oxide magnetic nanoparticle powder having a ferromagnetic property even if the particles have an average particle size of 15 nm or less, preferably 10 nm or less, and a method of producing the same, an iron oxide magnetic nanoparticle thin film containing the iron oxide magnetic nanoparticle powder and a method of producing the same, wherein the iron oxide magnetic nanoparticles having an $\epsilon$-$Fe_2O_3$ single phase, having the average particle size of 15 nm or less, and further 10 nm or less, are generated by using $\beta$-FeO(OH) (iron oxide hydroxide) nanoparticles as a starting material, and coating the (iron oxide hydroxide) nanoparticles with silicon oxide, and applying heat treatment thereto under an atmospheric air, and further
(Continued)

the iron oxide magnetic nanoparticle thin film is obtained by using the iron oxide magnetic nanoparticles.

11 Claims, 15 Drawing Sheets

(51) Int. Cl.
    *H01F 1/055* (2006.01)
    *C01G 49/06* (2006.01)
    *H01F 1/00* (2006.01)

(52) U.S. Cl.
    CPC ...... *C01P 2002/72* (2013.01); *C01P 2004/03* (2013.01); *C01P 2004/04* (2013.01); *C01P 2004/64* (2013.01); *C01P 2004/84* (2013.01); *C01P 2006/42* (2013.01)

(58) Field of Classification Search
    USPC ..................................................... 252/62.56
    See application file for complete search history.

(56) References Cited

FOREIGN PATENT DOCUMENTS

| | | |
|---|---|---|
| JP | 2008-063201 A | 3/2008 |
| JP | 2008-100871 A | 5/2008 |
| JP | 2008-174405 A | 7/2008 |
| JP | 2009-206476 A | 9/2009 |

OTHER PUBLICATIONS

Yakushkin. Formation Conditions of a Magnetically Ordered Phase ϵ-Fe2O3. Journal of Structural Chemistry. vol. 54, No. 5, pp. 876-882, 2013.*
Jun. 3, 2014 Search Report issued in International Patent Application No. PCT/JP2014/061585.
Ponce-Castañeda, S. et al., "Infrared Spectroscopy Analysis of Oxyhydroxides as Intermediate Species in the Formation of Iron Oxides-Silica Xerogels", Journal of Sol-Gel Science and Technology, 2003, vol. 27, pp. 247-254.

* cited by examiner

IRON OXIDE MAGNETIC NANOPARTICLE POWDER AND METHOD OF PRODUCING THE SAME, IRON OXIDE MAGNETIC NANOPARTICLE THIN FILM CONTAINING THE IRON OXIDE MAGNETIC NANOPARTICLE POWDER AND METHOD OF PRODUCING THE SAME

TECHNICAL FIELD

The present invention relates to an iron oxide magnetic nanoparticle powder used for high density magnetic recording medium and an electromagnetic wave absorption, a method of producing the same, and an iron oxide magnetic nanoparticle thin film containing the iron oxide magnetic nanoparticle powder, and a method of producing the same.

DESCRIPTION OF RELATED ART

While $\epsilon$-$Fe_2O_3$ phase is a rare phase among the iron oxides, inventors of the present invention obtains this phase for the first time in 2004, as a single phase by chemical nanoparticles synthesis method using a reverse micelle method and a sol-gel method. Then, it is found that the obtained $\epsilon$-$Fe_2O_3$ phase exhibits a giant coercive force of 20 kOe ($1.59 \times 10^6$ A/m) at a room temperature. This is a highest value of a magnetic oxide material. It is also found that the $\epsilon$-$Fe_2O_3$ phase exhibits an electromagnetic wave absorption due to a natural resonance phenomenon at a high frequency of 182 GHz. This is a highest frequency of the magnetic material. Thus, the $\epsilon$-$Fe_2O_3$ phase has a huge magnetic anisotropy.

The inventors of the present invention disclose a particle having a metal-substituted $\epsilon$-$M_xFe_{(2-x)}O_3$ phase, as patent document 1.

PRIOR ART DOCUMENT

Patent Document

Patent document 1: Japanese Patent Laid Open Publication No. 2008-174405

SUMMARY OF THE INVENTION

Problem to be Solved by the Invention

From the viewpoint of high-density magnetic recording, development of the magnetic material having a small particle size, is very important. However, a conventional magnetic ferrite has a small magnetic anisotropy, and therefore a ferromagnetic property is lost if the particle has a particle size of 10 nm or less.

On the other hand, it is desired that the magnetic material for the use of the magnetic recording medium, has a small particle size, and it is also desired that a variation of the particle size is small in the recording medium, to obtain an excellent switching field distribution (SFD).

Conventionally, it is known that $\epsilon$-$Fe_2O_3$ single phase in the metal-substituted $\epsilon$ iron oxide ($\epsilon$-$M_xFe_{(2-x)}O_3$) can be synthesized, but it is difficult to synthesize the $\epsilon$-$Fe_2O_3$ single phase not containing the metal-substituted element, and it has been so judged that the single phase cannot be obtained by a normal sol-gel method.

Further, as described above, finer particles are essential for obtaining a high recording density of the magnetic recording medium. However, there is a problem that the coercive force decreases significantly, as the particles become finer. Generally, if the substituted element M is added to the $\epsilon$ iron oxide, the coercive force is decreased, an therefore if the $\epsilon$ iron oxide not containing the substituted element can be synthesized, it is expected to obtain a magnetic powder having fine particles and high coercive force. Further, if a hetero-phase such as $\alpha$ iron oxide and $\gamma$ iron oxide is precipitated, the coercive force is significantly decreased in some cases. Therefore, the inventors of the present invention consider that it is desirable to suppress the precipitation of the hetero-phase such as $\alpha$ iron oxide and $\gamma$ iron oxide, to a level of not decreasing the coercive force, and synthesize the $\epsilon$ iron oxide.

Further, the $\epsilon$ iron oxide not containing the substituted element, has a specific magnetic property, and is expected to develop as a magnetic recording material and a magnetooptical material. In order to expect such a development, it is requested to obtain a thin film containing the $\epsilon$-$Fe_2O_3$ single phase.

The present invention is provided under the abovementioned circumstance, and a problem to be solved is to provide an iron oxide magnetic nanoparticle powder containing iron oxide magnetic nanoparticles having a ferromagnetic property even in an average particle size of 15 nm or less, preferably 10 nm or less, and a method of producing the same, and further to provide an iron oxide magnetic nanoparticle thin film containing the iron oxide magnetic nanoparticles and a method of producing the same.

Means for Solving the Problem

In order to solve the above-described problem, as a result of an examination by the inventors of the present invention, it is found that in a case of the iron oxide magnetic nanoparticle powder of the $\epsilon$-$Fe_2O_3$ single phase, even if the particle has an average particle size of 15 nm or less and further 10 nm or less, the particle has the ferromagnetic characteristic, and can be used as a high density magnetic recording material.

On the other hand, as a synthesis method of obtaining a fine particle powder having the $\epsilon$-$Fe_2O_3$ phase of a conventional technique, (1) A synthesis method based on a combination of a reverse micelle method and a sol-gel method (crystal having the $\epsilon$-$Fe_2O_3$ phase of a rod type), and
(2) A nanoparticle synthesis method using mesoporous silica as a template,
can be given.

However, only a small quantity of a sample can be obtained by any one of the synthesis methods, and the average particle size of the obtained iron oxide magnetic nanoparticles is larger than 25 nm.

Further, as the synthesis method of the iron oxide magnetic nanoparticle powder having the $\epsilon$-$Fe_2O_3$ phase as a main phase, (3) A synthesis method by a sol-gel method, and
(4) A synthesis method of applying heat treatment to a cubic iron oxide coated with silicon oxide,
can be given,
wherein the generated iron oxide magnetic nanoparticles contain an impurity phase of $\alpha$-$Fe_2O_3$ phase, etc., that decreases the magnetic property.

As a result of the examination by the inventors of the present invention, etc., to solve the above-described problem, it is found that by using $\beta$-FeO (OH) (iron oxide hydroxide) nanoparticle as a starting material, and coating this (iron oxide hydroxide) nanoparticle with silicon oxide, and applying heat treatment thereto under the atmospheric air, the iron oxide magnetic nanoparticle is generated having the $\epsilon$-Fe$_2$O$_3$ single phase and having the average particle size of 15 nm or less and further 10 nm or less.

It is also found that by coating a surface of a suitable substrate with the abovementioned (iron oxide hydroxide) nanoparticle coated with silicon oxide, and applying heat treatment thereto, the iron oxide magnetic nanoparticle thin film containing fine particle powder having the $\epsilon$-Fe$_2$O$_3$ single phase of a nano-size can be obtained. Thus, the present invention is completed.

Namely, in order to solve the above-described problem, the first invention is an iron oxide magnetic nanoparticle powder, containing iron oxide magnetic nanoparticles having $\epsilon$-Fe$_2$O$_3$ single phase and an average particle size of 15 nm or less.

The second invention is the iron oxide magnetic nanoparticle powder of the first invention, wherein the $\epsilon$-Fe$_2$O$_3$ single phase does not contain a substituted element.

The third invention is the iron oxide magnetic nanoparticle powder of the first or second inventions, wherein the coercive force is 0.35 kOe or more.

The fourth invention is the iron oxide magnetic nanoparticle powder of any one of the first to third inventions, containing an iron oxide magnetic nanoparticle powder having $\alpha$-Fe$_2$O$_3$ phase and/or an iron oxide magnetic nanoparticle powder having $\gamma$-Fe$_2$O$_3$ phase, in addition to the $\epsilon$-Fe$_2$O$_3$ single phase.

The fifth invention is an iron oxide magnetic nanoparticle thin film containing the iron oxide magnetic nanoparticle powder of any one of the first to fourth inventions, The sixth invention is the iron oxide magnetic nanoparticle thin film containing the iron oxide magnetic nanoparticle powder of any one of the first to fourth inventions, and SiO$_2$.

The seventh invention is a method of producing an iron oxide magnetic nanoparticle powder having $\epsilon$-Fe$_2$O$_3$ single phase, and having an average particle size of 15 nm or less, wherein $\beta$-FeO(OH) nanoparticle is coated with silicon oxide, and thereafter the $\beta$-FeO(OH) nanoparticle coated with the silicon oxide is subjected to heat treatment in an oxidizing atmosphere.

The eighth invention is the method of producing the iron oxide magnetic nanoparticle powder of the seventh invention, wherein an atmospheric air is used as the oxidizing atmosphere.

The ninth invention is the method of producing the iron oxide magnetic nanoparticle powder of the seventh or eighth invention, wherein particles having an average particle size of 15 nm or less is used as the $\beta$-FeO(OH) nanoparticles.

The tenth invention is a method of producing the iron oxide magnetic nanoparticle thin film containing iron oxide magnetic nanoparticles having an $\epsilon$-Fe$_2$O$_3$ single phase and having an average particle size of 15 nm or less, wherein an iron oxide magnetic nanoparticle thin film is obtained by coating a surface of a substrate with a dispersion liquid containing $\beta$-FeO(OH) nanoparticles coated with silicon oxide, and thereafter applying heat treatment thereto in an oxidizing atmosphere.

The eleventh invention is the method of producing the iron oxide magnetic nanoparticle thin film of the tenth invention, wherein an atmospheric air is used as the oxidizing atmosphere.

Advantage Of the Invention

The iron Oxide magnetic nanoparticle powder of the present invention has an excellent magnetic property such that a coercive force is 0.35 kOe or more while having an average particle size of 15 nm or less.

In addition, from a viewpoint of a development as a high density magnetic recording material and a magnetic optical material, it is possible to obtain an iron oxide magnetic nanoparticle thin film containing $\epsilon$-Fe$_2$O$_3$ single phase of a nano-size and having an average particle size considered to be optimum.

DETAILED DESCRIPTION OF THE INVENTION (Iron Oxide Magnetic Nanoparticle and Iron Oxide Magnetic Nanoparticle Powder According to the Present Invention)

Figure 2:
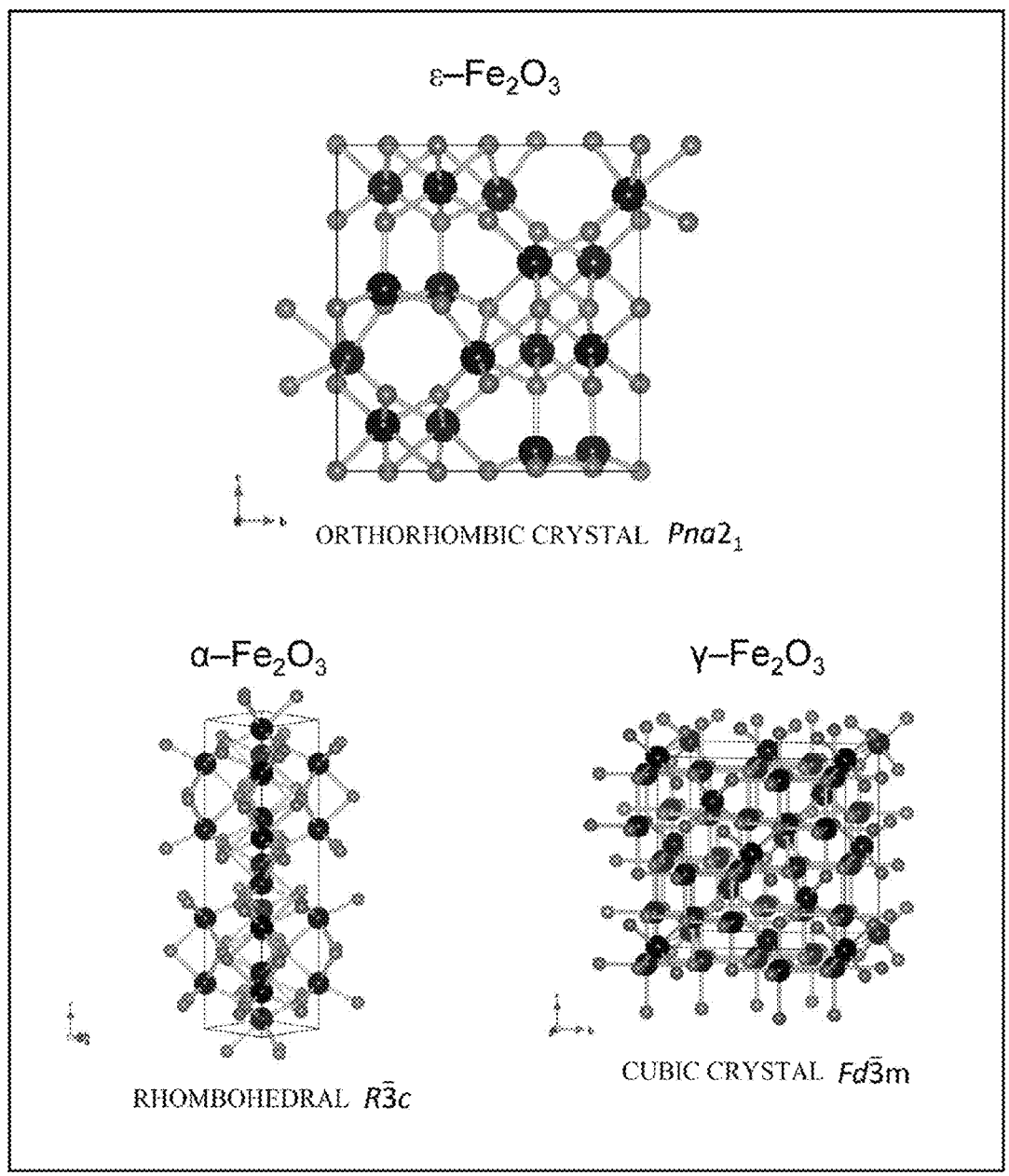
FIG. 2 is a schematic conceptual view of the crystal structures of $\epsilon$-Fe$_2$O$_3$ phase, $\alpha$-Fe$_2$O$_3$ phase, and $\gamma$-Fe$_2$O$_3$ phase.

The iron oxide magnetic nanoparticle powder of the present invention is the iron oxide magnetic nanoparticle powder containing iron oxide magnetic nanoparticles having an $\epsilon$-$Fe_2O_3$ single phase and having an average particle size of 15 nm or less. Wherein, FIG. 2 shows a schematic conceptual view of the structures of $\epsilon$-$Fe_2O_3$, $\alpha$-$Fe_2O_3$ and $\gamma$-$Fe_2O_3$ phases described later. In FIG. 2, large black spheres indicate the iron ions, small gray spheres indicate oxygen ions.

Figure 3:
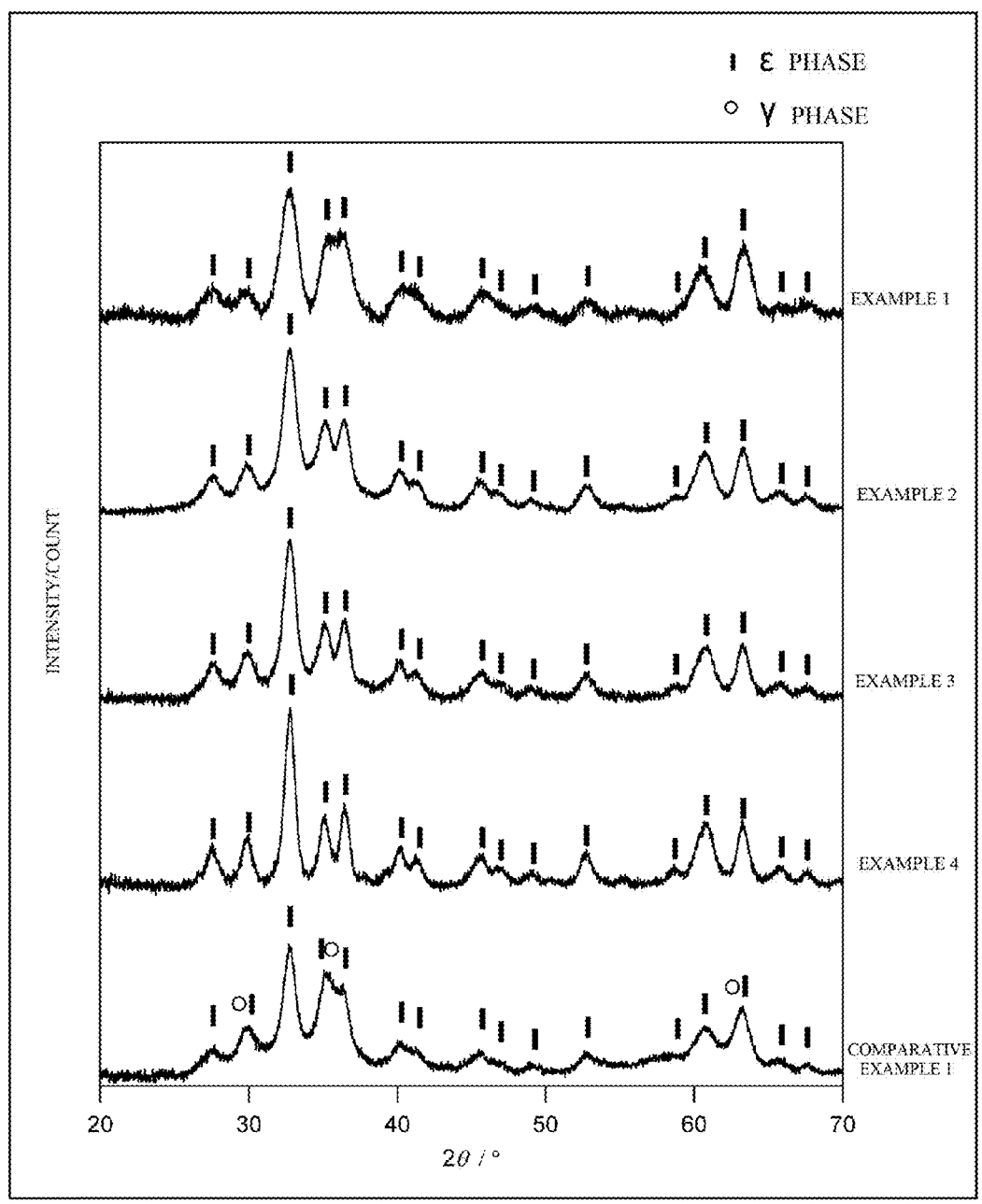
FIG. 3 is X-ray diffraction (XRD) pattern of a sample according to an example.

Next, FIG. 3 shows X-ray powder diffraction (XRD) pattern of example samples 1 to 4 of the iron oxide magnetic nanoparticle powder according to the present invention. In FIG. 3, black bars indicate the peaks of $\epsilon$-$Fe_2O_3$ phase, circles indicate the peaks of $\gamma$-$Fe_2O_3$ phase.

Note that sample 1 is the sample of example 1 described later, which is sintered at 950° C. in a production step, and sample 2 is the sample of example 2, which is sintered at 1000° C., and sample 3 is the sample of example 3, which is sintered at 1020° C., and sample 4 is the sample of example 4, which is sintered at 1026° C., and comparative example sample is the sample of comparative example 1, which is sintered at 1000° C.

Figure 4:
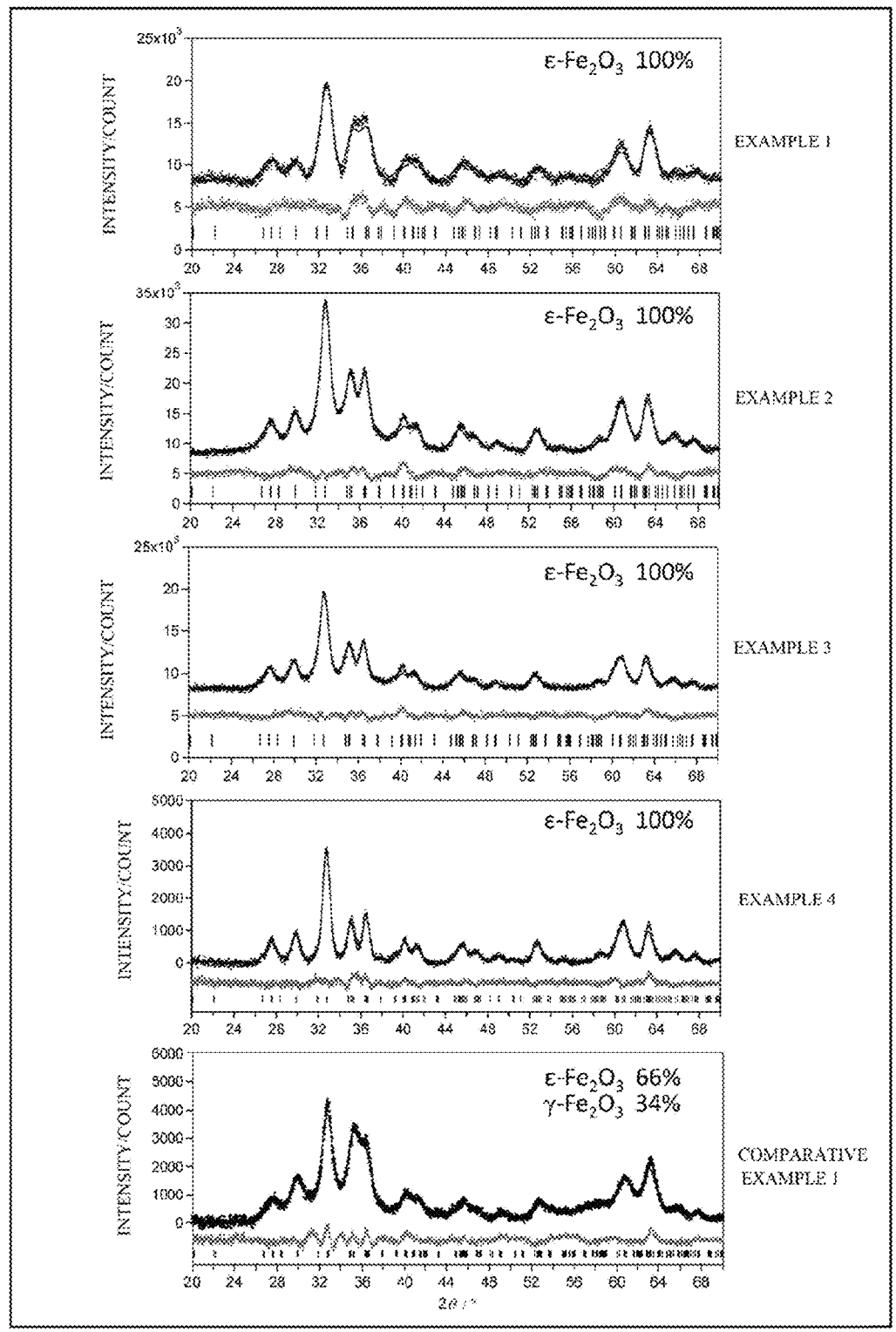
FIG. 4 is a Rietveld analysis result of the XRD pattern of the sample according to an example.

When the Rietveld analysis was performed to the XRD pattern of each sample, it was found that the $\epsilon$-$Fe_2O_3$ phase was 100% in samples 1 to 4, and the $\epsilon$-$Fe_2O_3$ phase was 66%, and $\gamma$-$Fe_2O_3$ phase was 34% in the sample of the comparative example. That is, it was found that samples 1 to 4 show the iron oxide magnetic nanoparticle powder of $\epsilon$-$Fe_2O_3$ single phase. FIG. 4 shows the result of the Rietveld analysis performed to the XRD pattern of these samples 1 to 4, and the comparative example sample. In FIG. 4, black dots indicate observed values, black lines indicate analysis values, gray lines indicate a difference between the observed value and the analyzed value, and black bars indicate a Bragg peak position of the $\epsilon$-$Fe_2O_3$ phase.

From the above result, it can be understood that a metal element other than Fe is not contained in the $\epsilon$-$Fe_2O_3$ phase of the iron oxide magnetic nanoparticle constituting the iron oxide magnetic nanoparticle powder of the present invention, as a substituted element.

Figure 5:
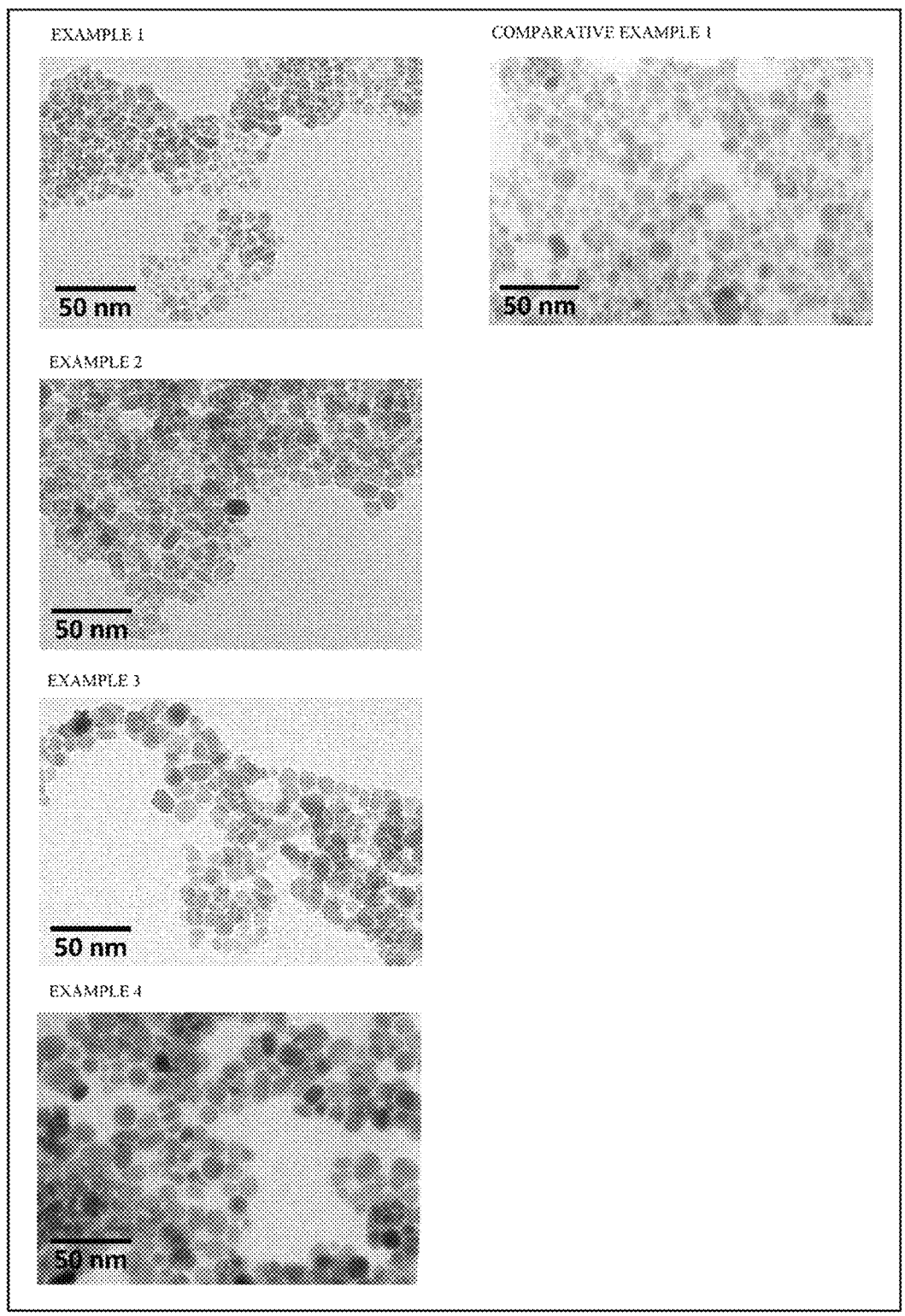
FIG. 5 is a TEM photograph of the sample according to an example.

Next, when a transmission electron microscope (TEM) observation was performed to example samples 1 to 4 and comparative example samples, spherical iron oxide magnetic nanoparticles were observed in example samples 1 to 4. FIG. 5 shows the TEM photograph of the example samples 1 to 4 and the comparative example sample.

Figure 6:
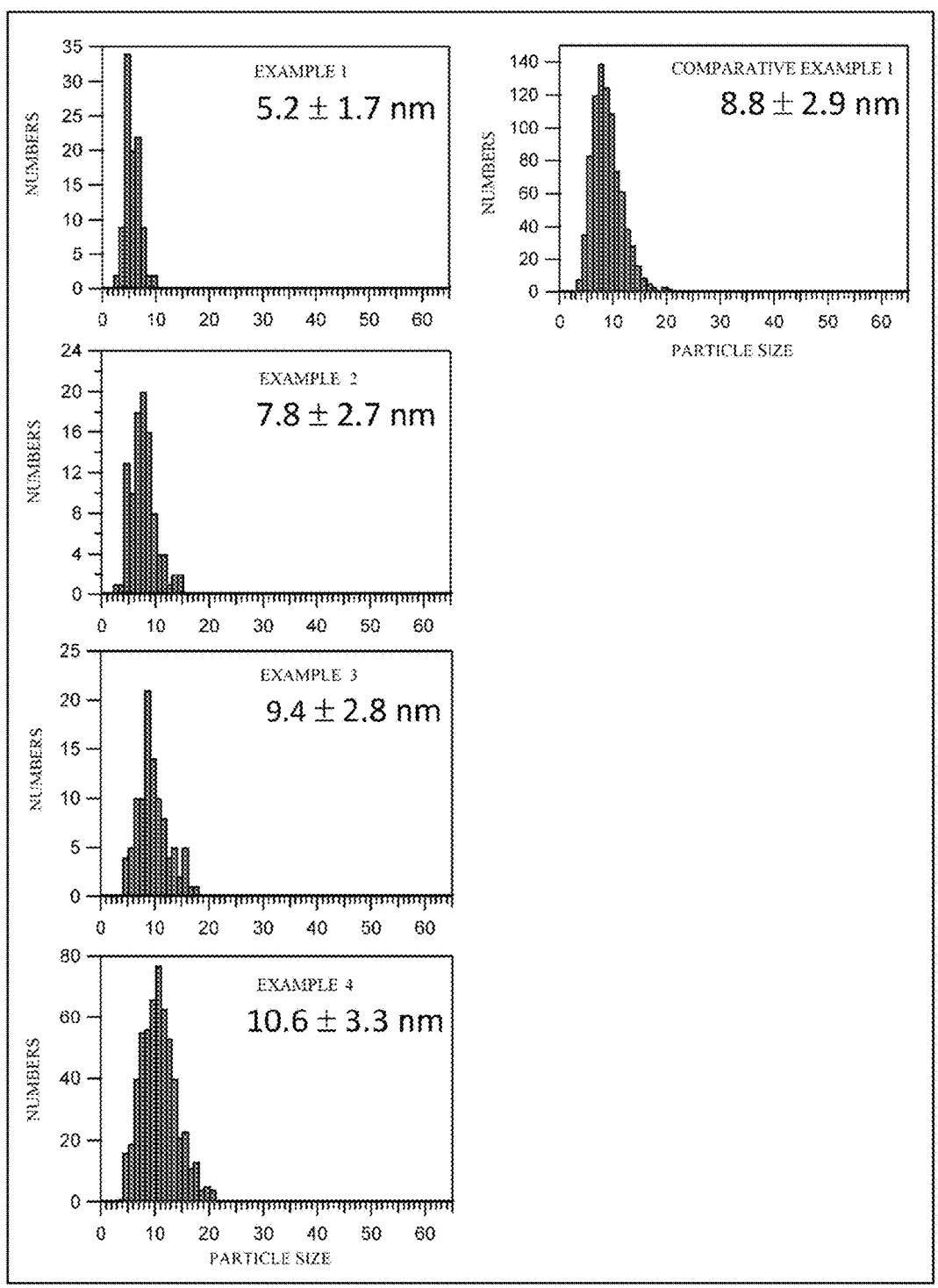
FIG. 6 is a graph showing a variation of a particle size of the sample according to an example.

Also, the average particle size was 5.2 to 9.4 nm in example samples 1 to 3, and the variation of the particle size was ±1.7 to 2.8 nm and small, and the average particle size was 10.6 nm in example sample 4 and the variation of the particle size was ±3.3 nm. FIG. 6 is the graph showing the variation of the particle size of the example samples 1 to 4, and the comparative example sample.

Figure 7:
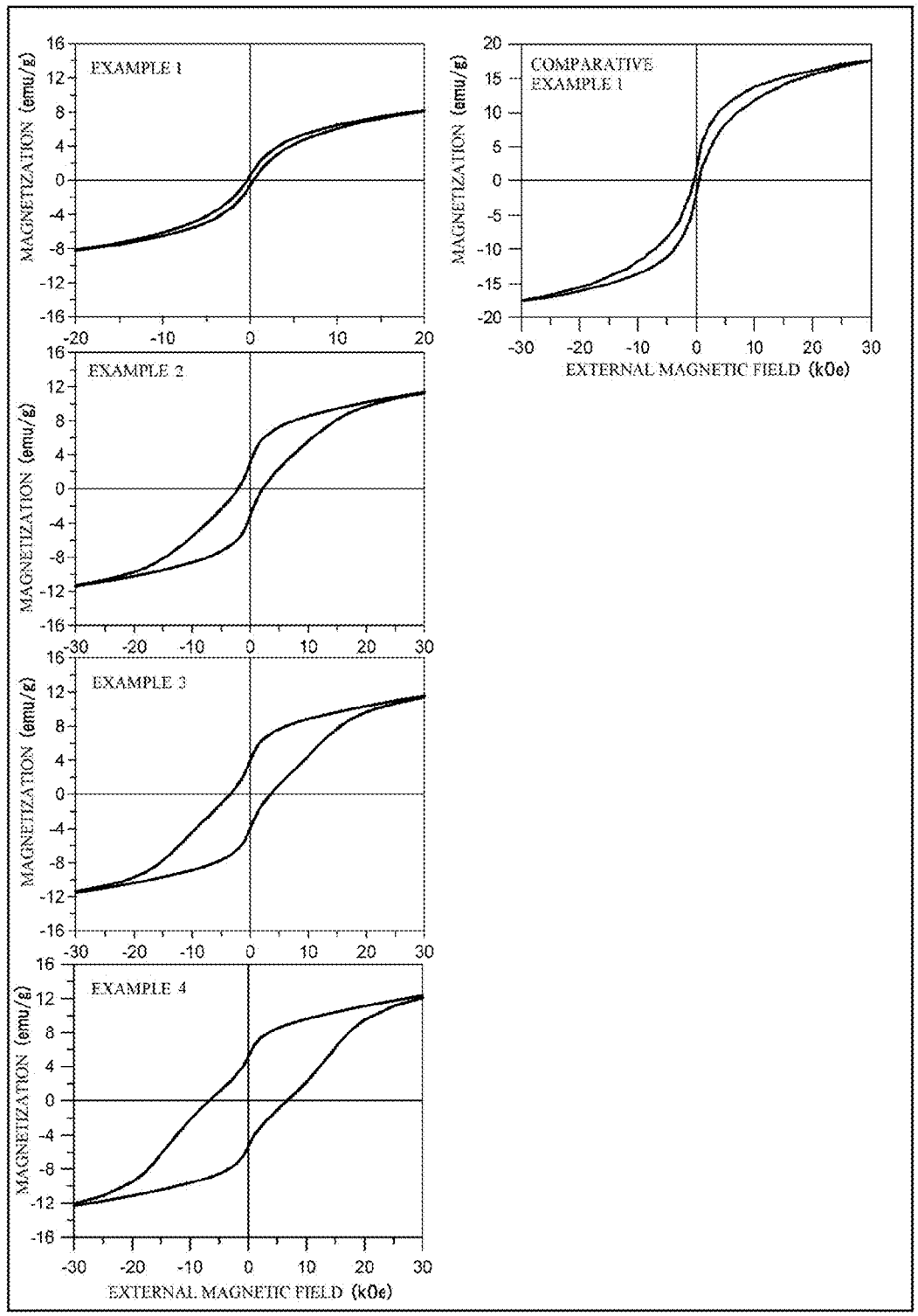
FIG. 7 is a graph showing a curve of a magnetization versus external magnetic field of the sample according to an example.

Next, when the curve of the magnetization-external magnetic field at 300 K was measured, it was found that a saturated magnetization was 10.8 to 13.3 emu/g, the coercive force was 0.35 to 3.5 kOe, and a residual magnetization was 0.6 to 4.0 emu/g in example samples 1 to 3, and the saturated magnetization was 14.1 emu/g, the coercive force was 6.7 kOe, and the residual magnetization was 5.2 emu/g in example sample 4, and it was found that any one of the samples is a ferromagnetic body. In addition, FIG. 7 shows the graph indicating the curve of the magnetization-external magnetic field of the example samples 1 to 4 and the comparative example sample.

Figure 8:
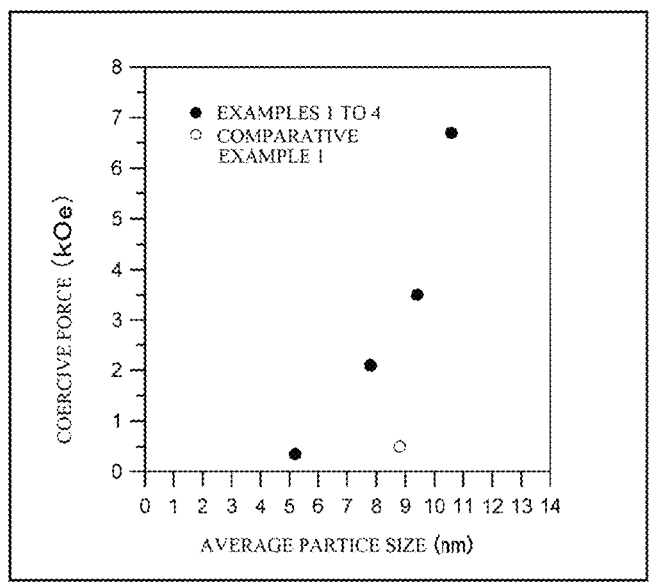
FIG. 8 is a graph showing a relation between an average particle size and a coercive force in the iron oxide magnetic nanoparticle powder according to the present invention.

FIG. 8 is the graph showing a relation between the average particle size and the coercive force of the iron oxide magnetic nanoparticle powder of example samples 1 to 4 and the comparative example sample. It was found that the coercive was small with decrease of the average particle size, from the plot of the coercive force with respect to the average particle size of each sample. It is conceivable that the plot of FIG. 8 shows the particle size dependence of the coercive force. Wherein, it was found that example samples 1 to 4 have a higher coercive force than the comparative example sample. This is because $\gamma$-$Fe_2O_3$ phase which is a hetero-phase is generated in comparative example 1, thus significantly decreasing the coercive force.

That is, a great effect of the present invention is that the synthesis of the $\epsilon$-$Fe_2O_3$ single phase was realized with the average particle size of 15 nm or less, thereby leading to the synthesis of the $\epsilon$-$Fe_2O_3$ having high coercive force for the first time, while the particles are fine particles.

Figure 9:
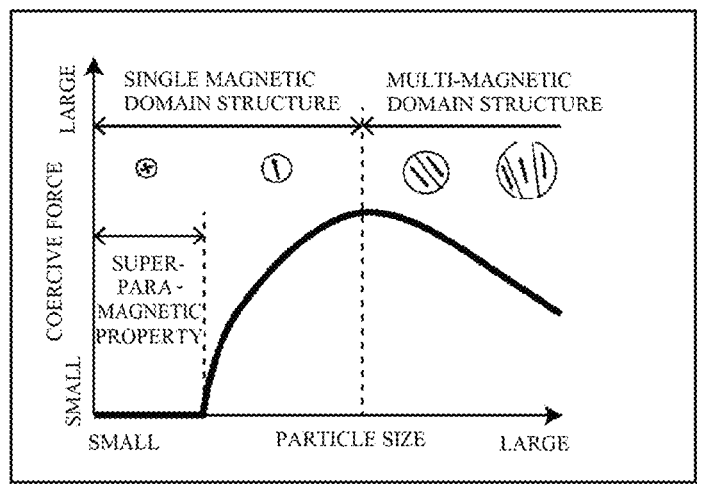
FIG. 9 is a schematic graph showing a particle size dependence of the coercive force in the iron oxide magnetic nanoparticle powder.

As shown in FIG. 9, it is known that generally the coercive force has the particle size dependence. If the particle size becomes smaller, the coercive force is increased, and is maximum when it has a single magnetic domain structure. This is because a domain wall movement occurs in a multi magnetic domain structure, and meanwhile magnetization occurs only in a rotational magnetization process in the single magnetic domain. If the particle size becomes further smaller, the coercive force was decreased, and the coercive force becomes zero in a superparamagnetic region. This phenomenon is explained as follows: if the particle becomes extremely small, an influence of a thermal fluctuation becomes large, and a spin is likely to be reversed. The tendency observed in FIG. 8 corresponds to the decrease of the coercive force observed in a region of the single magnetic domain structure, and owing to a large magnetic anisotropy of the $\epsilon$-$Fe_2O_3$ phase of the present invention, it is conceivable to obtain a magnetic material in a super-paramagnetic state, having a small particle size of 15 nm or less and further 10 nm or less.

(Method of Producing the Iron Oxide Magnetic Nanoparticle Powder of the Present Invention)

Figure 1:
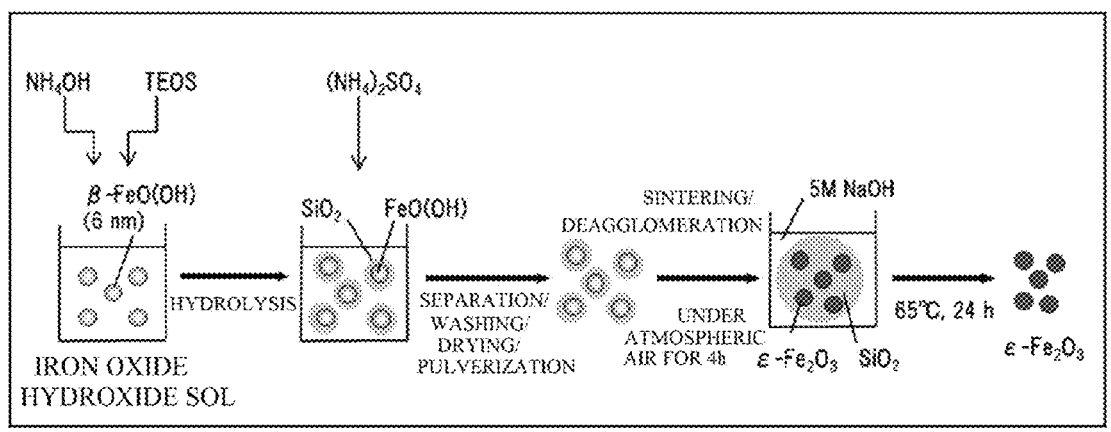
FIG. 1 is a conceptual view of a method of producing an iron oxide magnetic nanoparticle powder according to the present invention.

Here, explanation is given for a method of producing the iron oxide magnetic nanoparticle powder of the present invention, with reference to FIG. 1 which is a conceptual view of the method of producing the iron oxide magnetic nanoparticle powder of the present invention.

Iron oxide hydroxide (III) nanoparticles ($\beta$-FeO(OH)) having the average particle size of 15 nm or less and pure water were mixed, to thereby prepare a dispersion liquid of 0.01 mol/L or more and 1 mol/L or less in terms of iron (Fe) concentration.

Ammonia 3 to 30 moles per 1 mol of the iron oxide hydroxide (III) was added by dropping aqueous ammonia, and the mixture was stirred at 0 to 100° C., preferably 20 to 60° C.

Further, tetraethoxysilane (TEOS) 0.5 to 15 moles per 1 mole of the oxide hydroxide (III) was added dropwise to a dispersion liquid into which the ammonia was added, and the mixture was stirred for 15 hours or more and 30 hours or less and thereafter cooled to a room temperature.

Then, ammonium sulfate 1 to 30 moles per 1 mol of the oxide hydroxide (III) was added into the cooled dispersion liquid, so that a precipitate was deposited.

The deposited precipitate was collected and washed by pure water, and thereafter dried at about 60° C. Further, the dried precipitate was pulverized, to thereby obtain a pulverized powder.

The pulverized powder was subjected to heat treatment under the oxidizing atmosphere at 900° C. or more, less than 1200° C., preferably 950° C. or more and 1150° C. or less, for 0.5 to 10 hours, preferably 2 to 5 hours, to thereby obtain a heat-treated powder. The obtained heat-treated powder was subjected to deagglomeration treatment in an oxidizing atmosphere, and thereafter added into a sodium hydroxide (NaOH) solution having a liquid temperature of 60° C. or more and 70° C. or less, and the mixture was stirred for 15 hours or more and 30 hours or less so that silicon oxide was removed from the heat-treated powder, to thereby generate the iron oxide magnetic nanoparticle powder of the $\epsilon$-$Fe_2O_3$ single phase.

Note that it is preferable to use the atmospheric air as the oxidizing atmosphere, from a viewpoint of a cost and workability.

Subsequently, the generated iron oxide magnetic nanoparticle powder of the $\epsilon$-$Fe_2O_3$ single phase was separated/collected by filtration or centrifugation or the like and washed by water, to thereby obtain the iron oxide magnetic nanoparticle powder of the present invention containing the iron oxide magnetic nanoparticles having the $\epsilon$-$Fe_2O_3$ single phase, and having the average particle size of 15 nm or less. It is also possible to obtain the iron oxide magnetic nanoparticle powder containing the iron oxide magnetic nanoparticles having the average particle size of 10 nm or less, under control of a sintering condition (see examples 1 and 2 described later).

Further, there is no element having 1.0 wt % or more other than Fe and O among the detected elements, in the generated iron oxide magnetic nanoparticle powder. Accordingly, it can be considered that the iron oxide magnetic nanoparticles having the $\epsilon$-$Fe_2O_3$ single phase does not contain the substituted element.

(Comparison between the method of producing the iron oxide magnetic nanoparticle powder of the present invention, and a sol-gel method of a conventional technique)

Here, the method of producing the iron oxide magnetic nanoparticle powder of the present invention, and the sol-gel method of the conventional technique will be compared from the viewpoint of the particle size and the coercive force.

In the sol-gel method of the conventional technique, as shown in comparative example 1 described later, the $\epsilon$ iron oxide single phase having the average particle size of 15 nm or less could not be obtained. As a result, the $\epsilon$ iron oxide having a high coercive force could not be obtained. Further, as a substituted element, Al substitution $\epsilon$ iron oxide which is obtained by being substituted with Al as a substitution element, had only a low coercive force, and therefore in the sol-gel method of the conventional technique, it is impossible to synthesize the iron oxide magnetic nanoparticle having the high coercive force while being the fine particle of the particle size of 15 nm or less. On the other hand, in the method of producing the iron oxide magnetic particle powder of the present invention, it can be understood that the $\epsilon$ iron oxide single phase can be synthesized without containing the substituted element, and therefore the $\epsilon$ iron oxide having the high coercive force can be synthesized while being the fine particle of 15 nm or less.

(Method of producing the iron oxide magnetic particle thin film of the present invention)

Figure 10:
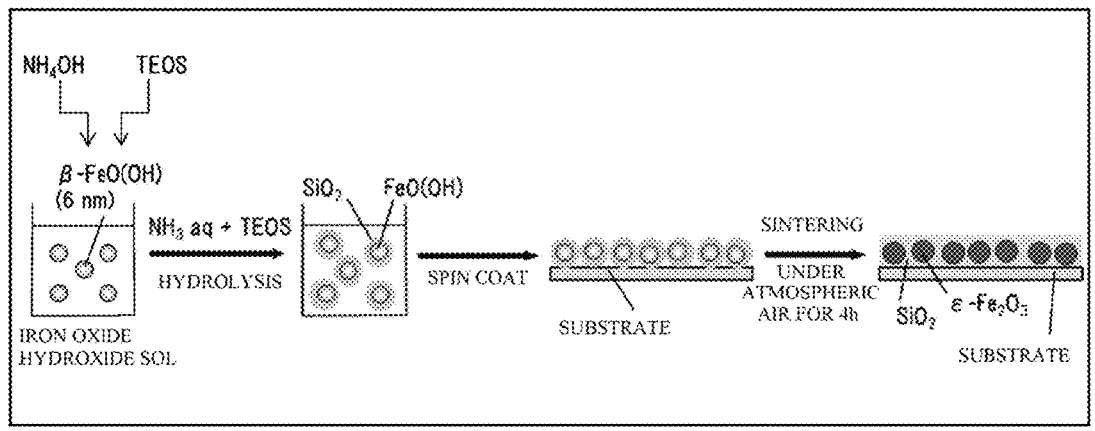
FIG. 10 is a schematic view showing a synthesis method of the iron oxide magnetic nanoparticle thin film according to the present invention.

The method of synthesizing the iron oxide magnetic nanoparticle thin film of the present invention will be described, with reference to FIG. 10.

Similarly to the above description (method of producing the iron oxide magnetic nanoparticle powder of the present invention), the iron oxide hydroxide (III) nanoparticles ($\beta$-FeO (OH)) and pure water were mixed, to thereby prepare a dispersion liquid of 0.01 mol/L or more and 1 mol/L or less in terms of iron (Fe) concentration.

Ammonia 3 to 30 moles per 1 mol of the iron oxide hydroxide (III) was added by dropping aqueous ammonia, and the mixture was stirred at 0 to 100° C., preferably 20 to 60° C.

Further, tetraethoxysilane (TEOS) 0.5 to 15 moles per 1 mole of the oxide hydroxide (III) was added dropwise to a dispersion liquid into which the ammonia was added, and the mixture was stirred for 15 hours or more and 30 hours or less and thereafter cooled to a room temperature.

The obtained dispersion liquid was applied on a suitable substrate such as a quartz substrate, etc., using a coating method such as spin coating, etc., to thereby form a film. Then, this formed film was subjected to heat treatment in the oxidizing atmosphere at 900° C. or more, less than 1200° C., preferably 950° C. or more and 1150° C. or less, for 0.5 to 10 hours, preferably 2 to 5 hours, to thereby obtain the iron oxide magnetic nanoparticle thin film of the present invention.

Note that it is preferable to use atmospheric air as the oxidizing atmosphere, from the viewpoint of workability.

(Structure and form of the iron oxide magnetic nanoparticle thin film of the present invention)

Figure 11:
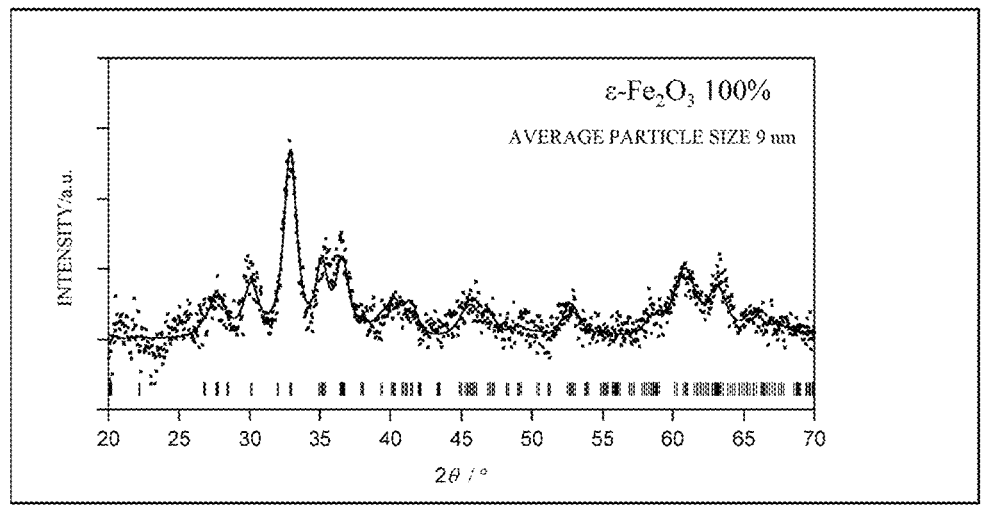
FIG. 11 shows an XRD pattern and a Rietveld analysis result of the iron oxide magnetic nanoparticle thin film according to example 5.
Figure 12:
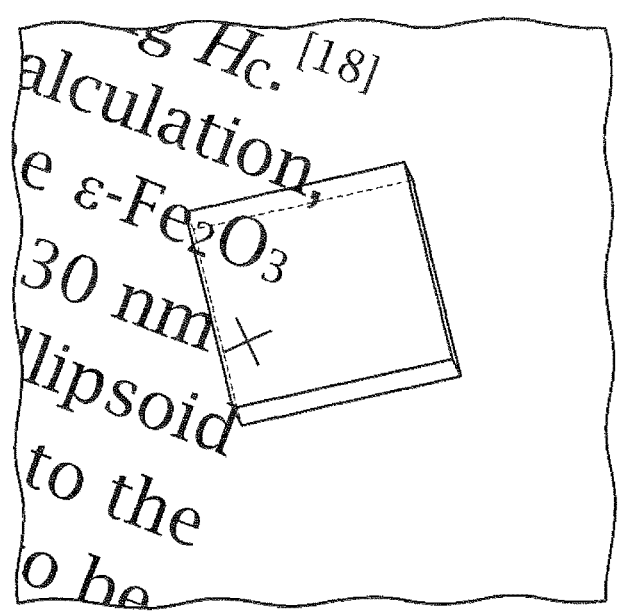
FIG. 12 shows an outer appearance of the iron oxide magnetic nanoparticle thin film according to example 5.

It was found that the iron oxide magnetic nanoparticle thin film of the present invention obtained by the above-mentioned method, had particles having $\epsilon$-$Fe_2O_3$ phase, from the X-ray diffraction (XRD) pattern and the Rietbelt analysis (FIG. 11). It was also found that by application of the Scherrer equation, the average particle size of the fine particle of the nano-size having the $\epsilon$-$Fe_2O_3$ phase, was about 9 nm. As shown in FIG. 12, the obtained magnetic particle thin film was transparent, and its film thickness was about 570 nm from the cross-sectional SEM photograph shown in FIG. 13. Therefore, as shown in the schematic view of FIG. 14, it is considered that the iron oxide magnetic nanoparticle thin film is configured so that fine particles having the $\epsilon$-$Fe_2O_3$ single phase of nano size was contained and dispersed in the silicon oxide.

(Magnetic optical property and magnetic property of the iron oxide magnetic particle thin film of the present invention)

Further, the iron oxide magnetic nanoparticle thin film of the present invention had the coercive force of about 3 kOe at a room temperature. It was also found that this thin film had a magnetic optical effect. Then, as a result of SQUID measurement performed to this thin film, it was found that there was a coincidence between the result of the Faraday effect and the coercive force.

(Conclusion)

According to the present invention, there is provided the iron oxide magnetic nanoparticles, the iron oxide nanoparticle powder containing the iron oxide magnetic nanoparticles, and the iron oxide magnetic nanoparticle thin film containing the iron oxide magnetic nanoparticle powder, having the coercive force of 0.35 kOe or more, the $\epsilon$-$Fe_2O_3$ single phase, and the average particle size of 15 nm or less, whose application can be expected in a field of magnetic recording and magnetic shielding, etc. The iron oxide magnetic nanoparticle of the present invention realizes higher density than a crystal of the conventional technique having the $\epsilon$-$Fe_2O_3$ single phase, in the application as a magnetic recording material.

Further, according to the present invention, there is provided the method of producing the iron oxide magnetic nanoparticle powder, which is capable of more easily synthesizing the iron oxide magnetic nanoparticle powder than the conventional technique by using the iron oxide hydroxide (III) nanoparticles ($\beta$-FeO (OH)) having the average particle size of 15 nm or less as the starting material, the iron oxide magnetic nanoparticle powder containing the iron oxide magnetic nanoparticles having the $\epsilon$-$Fe_2O_3$ single phase, having the average particle size of 15 nm or less, with small variation of the particle size, and having a ferromagnetic property. Further, the $\epsilon$-$Fe_2O_3$ phase was obtained in a wider sintering temperature region than the conventional technique. Then, it was also found that the particle size of the iron oxide magnetic particle powder could be controlled by controlling the sintering temperature using the wider sintering temperature region, and the magnetic property could be controlled by controlling the particle size and particularly the coercive force could be greatly changed. For example, when the sintering temperature was set to 1020° C., it was possible to obtain the iron oxide magnetic particles having the $\epsilon$-$Fe_2O_3$ single phase and the average particle size of 15 nm or less, and having the abovementioned coercive force of 3.5 kOe which was a value suitable for the magnetic recording, and possible to obtain the iron oxide magnetic nanoparticle powder containing the iron oxide magnetic nanoparticles.

As described above, it is expected that the present invention can be industrially applied in various purpose of use, from the convenience of the synthesis method and the safety and stability of the material.

As described above, the coercive force of the iron oxide magnetic nanoparticle thin film of the present invention has about 3 kOe at a room temperature and has a magnetic optical effect. As a result, the thin film has a property significantly suitable as a magnetic recording material. According to the present invention, while the thin film is made of a material having a simple $Fe_2O_3$ composition, the ferromagnetic thin film containing such small particles can be obtained, and therefore the thin film has a broad application range.

EXAMPLE

The present invention will be described, with reference to examples.

Example 1

Pure water 420 mL and a sol 8.0 g of the iron oxide hydroxide (III) nanoparticles ($\beta$-FeO(OH)) having the average particle size of about 6 nm were put in 1 L Erlenmeyer flask, and the mixture was stirred until a homogeneous dispersion liquid was obtained.

Then, 25% aqueous ammonia solution 19.2 mL was added thereto dropwise, and the mixture was stirred at 50° C. for 30 minutes. Tetraethoxysilane (TEOS) 24 mL was further added dropwise into this dispersion liquid, and the mixture was stirred at 50° C. for 20 hours, which was then cooled to a room temperature. When this dispersion liquid was cooled to the room temperature, ammonium sulfate 20 g was added so that a precipitate was deposited. The deposited precipitate was collected by centrifugation. The collected precipitate was washed by pure water, which was then moved to a dish and dried in a dryer at 60° C., and thereafter pulverized in an agate mortar, to obtain a pulverized powder.

The pulverized powder was loaded in a furnace, and heat treatment was applied thereto under the atmospheric air at 951° C. for 4 hours, to obtain a heat-treated powder. The obtained heat-treated powder was subjected to deagglomeration treatment in the agate mortar, and the mixture was stirred in 5 moles/L sodium hydroxide (NaOH) solution at a liquid temperature of 65° C. for 24 hours, to remove the silicon oxide from the heat-treated powder. Subsequently, the heat-treated powder from which the silicon oxide was removed, was collected by filtering, and washed by water, to obtain the iron oxide magnetic nanoparticle powder sample having the $\epsilon$-$Fe_2O_3$ single phase of example 1.

Table 1 shows the synthesis condition. The same thing can be said for examples 2 to 4.

The XRD pattern of the obtained sample was subjected to the Rietveld analysis, and it was found that the sample had 100% $\epsilon$-$Fe_2O_3$ phase. Specifically, phase fractions of $\alpha$-$Fe_2O_3$ phase, $\gamma$-$Fe_2O_3$ phase, and $\epsilon$-$Fe_2O_3$ phase were obtained by the Rietveld analysis performed to the XRD pattern of the sample.

FIG. 3 shows the XRD pattern of the obtained sample as example sample 1, and FIG. 4 shows a Rietveld analysis result of the XRD pattern as example sample 1, and table 2 shows a measurement result. The same thing can be said for examples 2 to 4 and comparative example 1.

When the obtained sample was observed by a transmission electron microscope (TEM) to obtain the average particle size, the average particle size was 5.2 nm. Specifically, 1,000,000 times magnified image of the sample was photographed by TEM, and a largest diameter and a smallest diameter in each sample particle were measured from this image, and its average value was calculated. Then, the average value of the particle size of at least 100 independent sample particles was selected as an average particle size of the sample powder.

FIG. 5 shows a TEM photograph of the obtained sample as example sample 1, and FIG. 6 shows a graph indicating the variation of particle size of the sample as example sample 1, and table 2 shows the measurement result.

Further, magnetic properties (saturated magnetization, coercive force, and residual magnetization) of the obtained sample, were measured. Specifically, the magnetic properties were measured in a maximum application magnetic field of 50 kOe, at a temperature of 300 K, using SQUID (superconducting quantum interferometer) of MPMS7 by Quantum Design Corporation.

FIG. 7 shows a graph indicating a curve of a magnetization-external magnetic field of the obtained sample as example sample 1, and further table 2 shows the measurement result. The same thing can be said for examples 2 to 4, and comparative example 1.

Example 2

The iron oxide magnetic particle powder sample of example 2 having the $\epsilon$-$Fe_2O_3$ single phase was obtained by performing a similar operation as example 1, excluding a point that the pulverized powder was loaded into the furnace to obtain the heat-treated powder subjected to heat treatment under the atmospheric air, at 1002° C., for 4 hours.

When the Rietveld analysis was performed to the XRD pattern of each sample by performing a similar operation as example 1, it was found that 100% $\epsilon$-$Fe_2O_3$ phase was obtained. When the obtained sample was observed at a 100,000 times magnification by a transmission electron microscope (TEM) to obtain the average particle size, the average particle size was 7.8 nm. FIG. 3 shows the XRD pattern of the obtained sample as example sample 2, and FIG. 4 shows the Rietveld analysis result of the XRD pattern as example sample 2, and FIG. 5 shows the TEM photograph as example sample 2, and FIG. 6 shows a graph indicating the variation of the granularity of the sample as example sample 2, and FIG. 7 shows a graph indicating a curve of a magnetization-external magnetic field as example sample 2, and table 2 shows the measurement result. The measurement condition is the same as example 1.

Example 3

The iron oxide magnetic nanoparticle sample of example 3 having the $\epsilon$-$Fe_2O_3$ single phase was obtained, by performing a similar operation as example 1, excluding a point that the pulverized powder was loaded in the furnace, and heat treatment was applied thereto under the atmospheric air at 1020° C. for 4 hours.

When the Rietveld analysis was performed to the XRD pattern of the obtained sample by the similar operation as example 1, it was found that 100% $\epsilon$-$Fe_2O_3$ phase was obtained. When the obtained sample was observed at a 100,000 times magnification by the transmission electron microscope (TEM) to obtain the average particle size, the average particle size was 9.4 nm.

FIG. 3 shows the XRD pattern of the obtained sample as example sample 3, and FIG. 4 shows the Rietveld analysis result of the XRD pattern as example sample 3, and FIG. 5 shows the TEM photograph as example sample 3, and FIG. 6 shows a graph indicating the variation of the granularity of the sample as example sample 3, and FIG. 7 shows a graph indicating a curve of a magnetization-external magnetic field as example sample 3, and table 2 shows the measurement result. The measurement condition is the same as example 1.

Example 4

The iron oxide magnetic nanoparticle sample of example 4 having the $\epsilon$-$Fe_2O_3$ single phase was obtained, by performing the similar operation as example 1, excluding a point that the pulverized powder was loaded in the furnace, and heat treatment was applied thereto under the atmospheric air at 1026° C. for 4 hours.

When the Rietveld analysis was performed to the XRD pattern of the obtained sample by the similar operation as example 1, it was found that 100% $\epsilon$-$Fe_2O_3$ phase was obtained. When the obtained sample was observed at a 100,000 times magnification by a transmission electron microscope (TEM) to obtain the average particle size, the average particle size was 10.6 nm.

FIG. 3 shows the XRD pattern of the obtained sample as example sample 4, and FIG. 4 shows the Rietveld analysis result of the XRD pattern as example sample 4, and FIG. 5 shows the TEM photograph as example sample 4, and FIG. 6 shows a graph indicating the variation of the granularity of the sample as example sample 4, and FIG. 7 shows a graph indicating a curve of a magnetization-external magnetic field as example sample 4, and table 2 shows the measurement result. The measurement condition is the same as example 1.

Comparative Example 1

Pure water 413 mL and $Fe(NO_3)_3 \cdot 9H_2O$ 20.6 g were put in 1 L Erlenmeyer flask, and the mixture was stirred until a homogeneous dispersion liquid was obtained. Then, 25% aqueous ammonia solution 34 mL diluted with pure water 379 mL was added thereto dropwise, and the mixture was stirred for 30 minutes. Tetraethoxysilane ($Si(OC_2H_5)_4$) 33.9 mL was further added dropwise into this dispersion liquid, and the mixture was stirred for 20 hours, which was then cooled to a room temperature. When this dispersion liquid was cooled to the room temperature, a precipitate was collected by centrifugation. The collected precipitate was washed by pure water and dried for one night at 65° C., and thereafter pulverized in the agate mortar, to obtain a pulverized powder.

The pulverized powder was loaded in the furnace, and heat treatment was applied thereto under the atmospheric air at 1000° C. for 4 hours, to obtain a heat-treated powder. The obtained heat-treated powder was subjected to deagglomeration treatment in the agate mortar, and the mixture was stirred in 5 moles/L sodium hydroxide (NaOH) solution at a liquid temperature of 65° C. for 24 hours, to remove the silicon oxide from the heat-treated powder. Subsequently, the heat-treated powder from which the silicon oxide was removed, was collected by filtering, and washed by water, to obtain the iron oxide magnetic nanoparticle sample of comparative example 1.

Thereafter, when the Rietveld analysis was performed to the XRD pattern of the obtained sample by performing the similar operation as example 1, it was found that 66% $\epsilon$-$Fe_2O_3$ phase and 34% $\gamma$-$Fe_2O_3$ phase were obtained. Also, when the obtained sample was observed at a 600,000 times magnification by the transmission electron microscope (TEM) to obtain the average particle size, the average particle size was 8.8 nm.

Further, table 2 shows the measurement result. The measurement condition is the same as example 1.

Example 5

(Synthesis of the iron oxide magnetic nanoparticle thin film)
Similarly to example 1, pure water 420 mL and a sol 8.0 g (10 mass % of concentration in terms of $Fe_2O_3$) of the iron oxide hydroxide (III) nanoparticles ($\beta$-FeO(OH)) having the average particle size of about 6 nm were put in 1 L Erlenmeyer flask, and the mixture was stirred until a homogeneous dispersion liquid was obtained.

Then, 25% aqueous ammonia solution 19.2 mL was added thereto dropwise at 1 to 2 droplets/sec, and the mixture was stirred at 50° C. for 30 minutes. Tetraethoxysilane (TEOS) 24 mL was further added into this dispersion liquid dropwise at 2 to 3 droplets/sec, and the mixture was stirred at 50° C. for 20 hours, which was then cooled to a room temperature, to obtain a dispersion liquid.

A surface of a quarts substrate was coated with the obtained dispersion liquid by spin coating to form a film. Then, heat treatment was applied thereto in the furnace at 1000° C. for 4 hours under the atmospheric air, to thereby obtain the iron oxide magnetic nanoparticle thin film containing the $\epsilon$-$Fe_2O_3$ particles of nano-size having a single phase in a dispersion state in the silicon oxide.

(Structure and form of the iron oxide magnetic nanoparticle thin film)

FIG. 11 shows the X-ray diffraction (XRD) pattern of the iron oxide magnetic nanoparticle thin film of example 5 obtained by the abovementioned producing method.

When the Rietveld analysis was performed to the XRD pattern, it was found that the $\epsilon$-$Fe_2O_3$ particles having the single phase and having the nano-size were contained in the silicon oxide. It was also found that by application of the Scherrer equation, the average particle size of the fine particle of the nano-size having the $\epsilon$-Fe$_2$O$_3$ phase, was about 9 nm.

Figure 13:
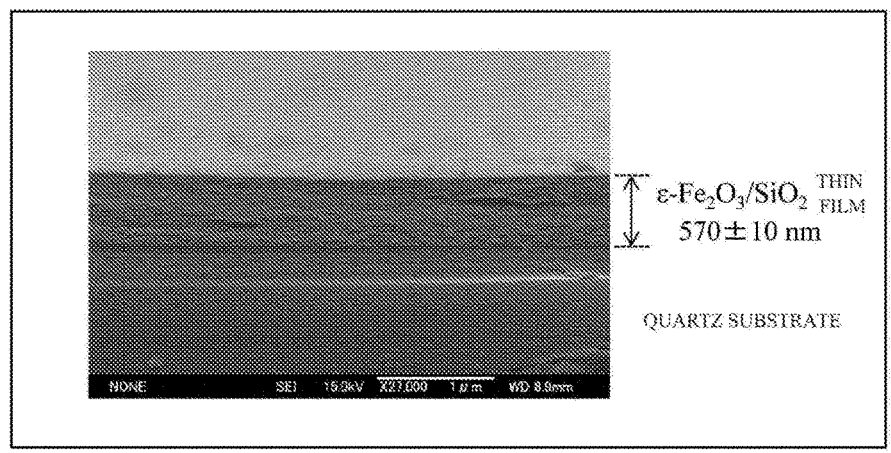
FIG. 13 is a cross-sectional SEM photograph of the iron oxide magnetic particle thin film according to example 5.

FIG. 12 shows an outer appearance photograph of the obtained iron oxide magnetic nanoparticle thin film. FIG. 13 shows the cross-sectional SEM photograph of the thin film. From the cross-sectional SEM photograph shown in FIG. 13, the film thickness of the thin film was obtained as 570±10 nm. Then, a volume ratio of $\epsilon$-Fe$_2$O$_3$ to SiO$_2$ is estimated as $\alpha$-Fe$_2$O$_3$:SiO$_2$=1:16, from a mixture composition of the abovementioned iron oxide hydroxide and tetra-ethoxysilane.

Figure 14:
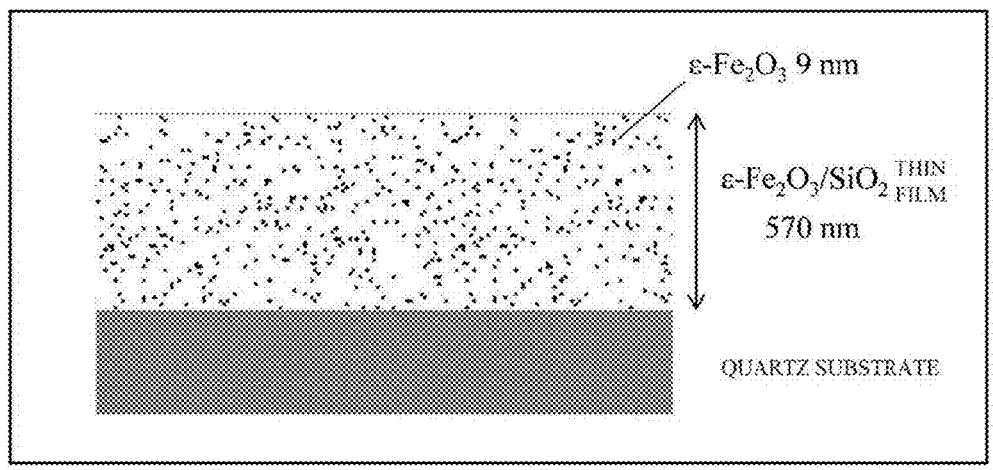
FIG. 14 is a schematic view of a cross-section of the iron oxide magnetic nanoparticle thin film according to example 5.

From the above result, as schematically shown in FIG. 14, it can be considered that the cross-sectional face of the thin film is configured in a state in which the $\epsilon$-Fe$_2$O$_3$ particles of the nano-size having the single phase, and having the average particle size of 9 nm for example, are contained in a dispersion state in the silicon oxide having a thickness of 570 nm for example.

(Magnetic optical property and magnetic property of the iron oxide magnetic nanoparticle thin film)

Figure 15:
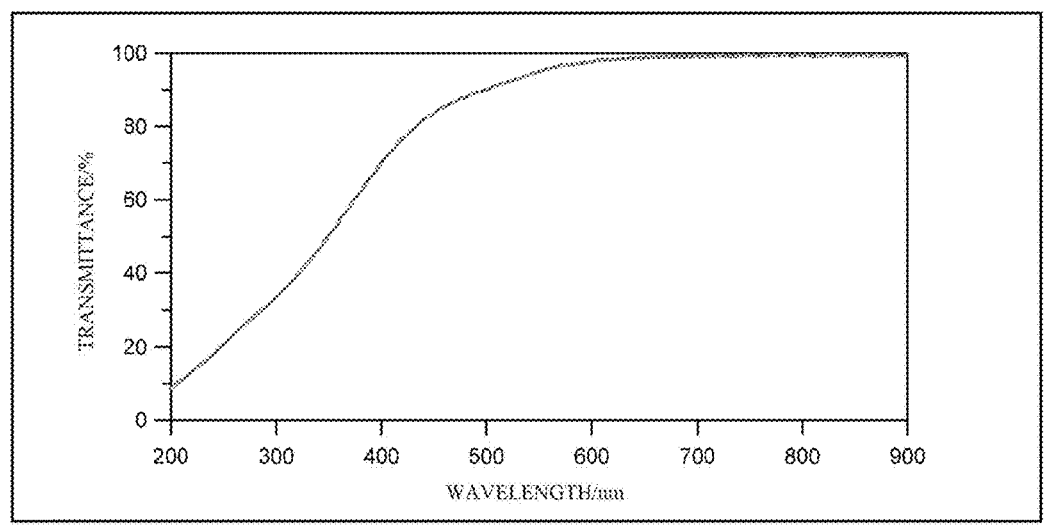
FIG. 15 is a graph showing a transmittance of a UV-vis spectrum of the iron oxide magnetic nanoparticle thin film according to example 5.
Figure 16:
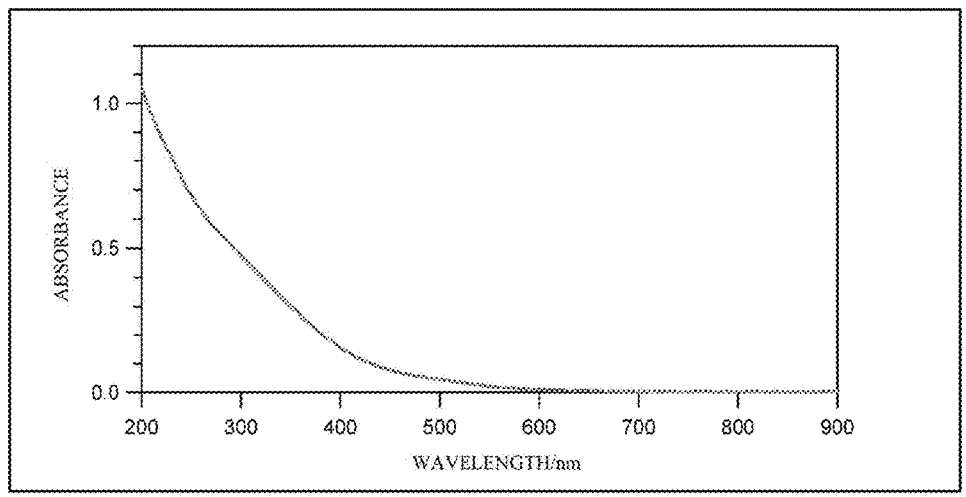
FIG. 16 is a graph showing an absorbance of the UV-vis spectrum of the iron oxide magnetic nanoparticle thin film according to example 5.

FIG. 15 shows a graph indicating a transmissivity in UV-vis spectrum of the iron oxide magnetic nanoparticle thin film of example 5, and FIG. 16 shows a graph of an absorbance.

Figure 17:
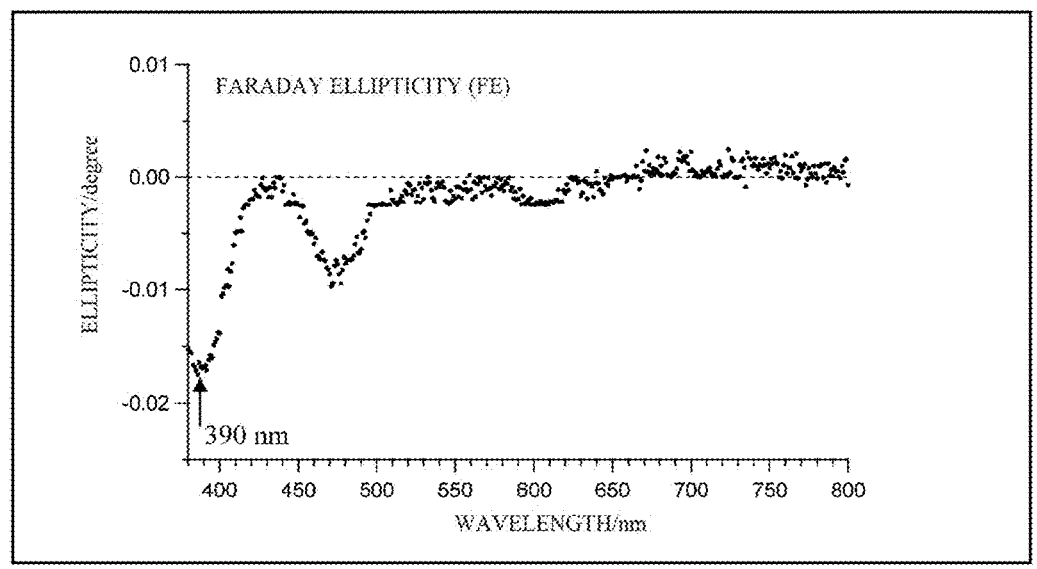
FIG. 17 is a graph showing a wavelength dependence of Faraday ellipticity (FE) of the iron oxide magnetic nanoparticle thin film at a room temperature according to example 5.
Figure 18:
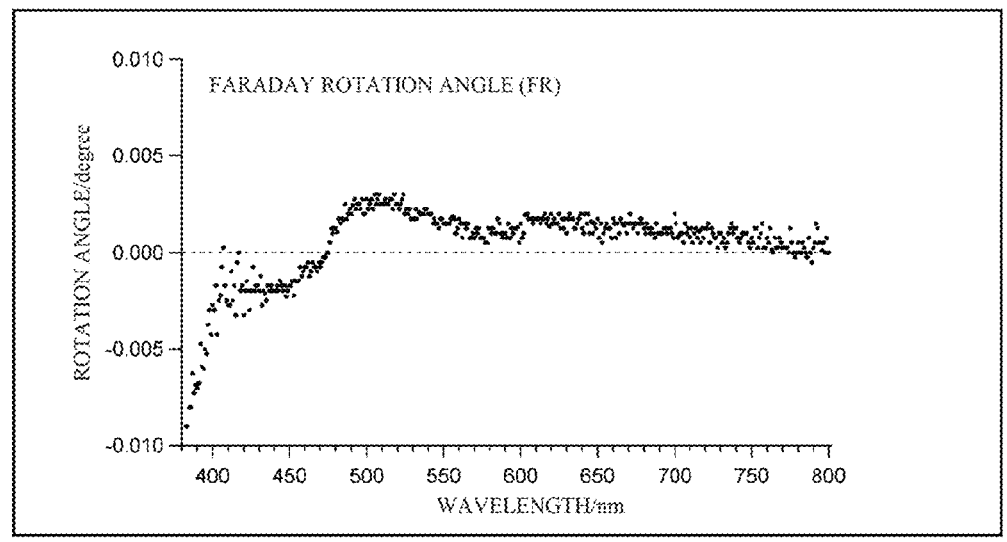
FIG. 18 is a graph showing a wavelength dependence of Faraday rotation angle (FR) of the iron oxide magnetic nanoparticle thin film at a room temperature according to example 5.

Then, FIG. 17 shows a graph of a wavelength dependence of Faraday ellipticity (FE) of the thin film at a room temperature, and FIG. 18 shows a graph of a wavelength dependence of Faraday rotation angle (FR) of the thin film at a room temperature.

Figure 19:
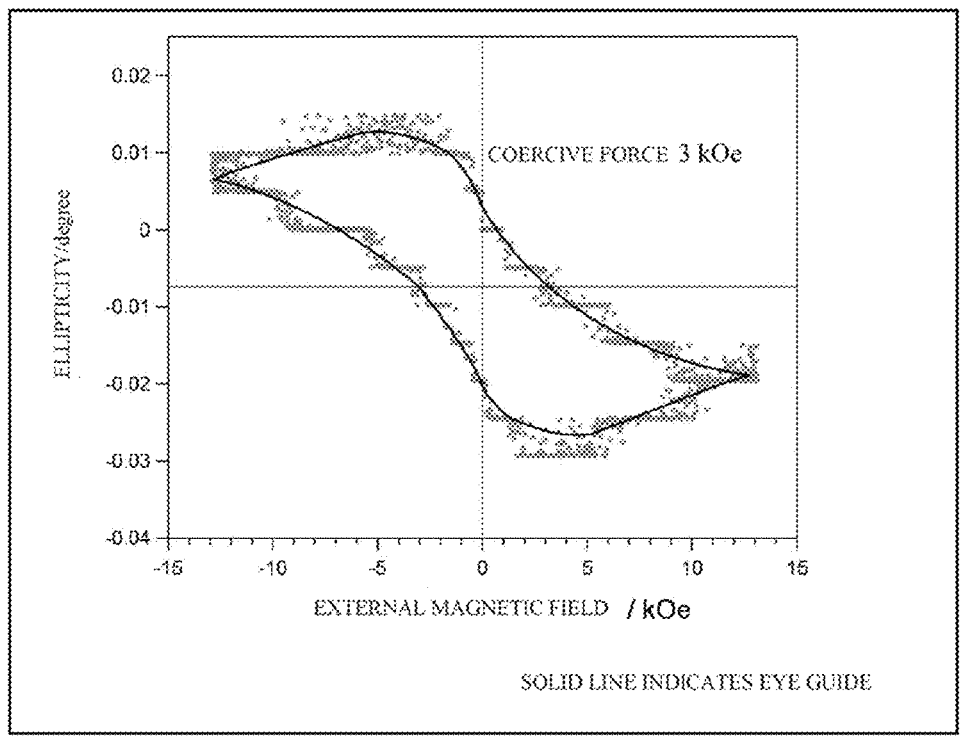
FIG. 19 is a graph showing external magnetic field dependence of Faraday ellipticity of the iron oxide magnetic nanoparticle thin film at a wavelength of 390 nm according to example 5.

Also, FIG. 19 shows a graph of a result of measuring an external magnetic field dependence of the Faraday ellipticity, at a wavelength of 390 nm where a signal of the Faraday ellipticity of the thin film is most strongly observed. A solid line in FIG. 19 indicates an eye guide.

Figure 20:
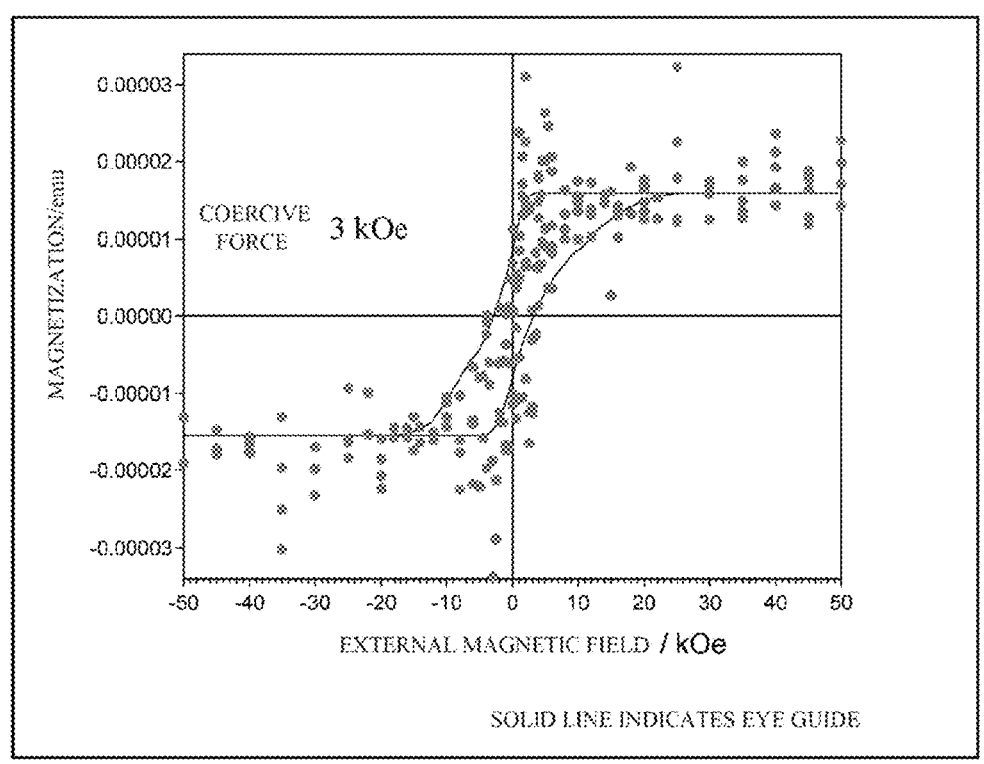
FIG. 20 is a graph showing a curve of a magnetization versus external magnetic field in the iron oxide magnetic nanoparticle thin film according to example 5.

Further, FIG. 20 shows a graph of a result of performing SQUID measurement to the thin film. A solid line in FIG. 20 indicates the eye guide.

From the above result, it was found that the coercive force of the thin film was 3 kOe at a room temperature. It also found that the magnetic optical effect could be obtained. Further, it was found that there was a coincidence between the result of the Farraday effect and the coercive force.

(Conclusion)

The iron oxide magnetic nanoparticle thin film of example 5 was a transparent $\epsilon$-Fe$_2$O$_3$ thin film having a thickness of about 570 nm, and configured in the dispersion state of the $\epsilon$-Fe$_2$O$_3$ particles of a nano-size having the single phase and having the average particle size of 9 nm. The coercive force of about 3 kOe of the thin film is considered to be significantly suitable as the magnetic recording material. Further, since the ferromagnetic thin film having such a small particle size can be obtained by the material having a simple Fe$_2$O$_3$ composition, a wider application field can be expected.

TABLE 1

Synthesis condition of each sample

| | Starting material | | | | Sintering | |
|---|---|---|---|---|---|---|
| Sample No. | Iron oxide hydroxide sol (g) | Pure water (mL) | Ammonia water (mL) | TEOS (mL) | Temperature (° C.) | Time (hr) |
| Example 1 | 8 | 420 | 19.2 | 24 | 951° C. | 4 |
| Example 2 | 8 | 420 | 19.2 | 24 | 1002° C. | 4 |
| Example 3 | 8 | 420 | 19.2 | 24 | 1020° C. | 4 |
| Example 4 | 8 | 420 | 19.2 | 24 | 1026° C. | 4 |

TABLE 2

Particle size of each sample, phase fraction obtained by Rietveld analysis of XRD pattern, and magnetic property at 300K

| Sample No. | Sintering temperature (° C.) | Average particle size (nm) | Phase fraction | Coercive force (kOe) | Saturation magnetization (emu/g) | Remanent magnetization (emu/g) |
|---|---|---|---|---|---|---|
| Example 1 | 951° C. | 5.2 ± 1.7 | $\epsilon$ phase 100% | 0.35 | 10.8 | 0.6 |
| Example 2 | 1002° C. | 7.8 ± 2.7 | $\epsilon$ phase 100% | 2.1 | 13.2 | 3.1 |
| Example 3 | 1020° C. | 9.4 ± 2.8 | $\epsilon$ phase 100% | 3.5 | 13.3 | 4.0 |
| Example 4 | 1026° C. | 10.6 ± 3.3 | $\epsilon$ phase 100% | 6.7 | 14.1 | 5.2 |
| Comparative example 1 | 1000° C. | 8.8 ± 2.9 | $\epsilon$ phase 66% $\gamma$ phase 34% | 0.5 | 19.6 | 1.8 |

The invention claimed is:

1. An iron oxide magnetic nanoparticle powder, containing iron oxide magnetic nanoparticles having $\epsilon$-Fe$_2$O$_3$ single phase, an average particle size from 5.2 nm to 10.6 nm, and a variation of the particle size from 1.7 nm to 3.3 nm.

2. The iron oxide magnetic nanoparticle powder according to claim 1, wherein the $\epsilon$-Fe$_2$O$_3$ single phase does not contain a substituted element.

3. The iron oxide magnetic nanoparticle powder according to claim 1, having a coercive force of 0.35 kOe or more.

4. The iron oxide magnetic nanoparticle powder of claim 1, containing an iron oxide magnetic nanoparticle powder having $\alpha$-Fe$_2$O$_3$ phase and/or an iron oxide magnetic nanoparticle powder having $\gamma$-Fe$_2$O$_3$ phase, in addition to the $\epsilon$-Fe$_2$O$_3$ single phase.

5. An iron oxide magnetic nanoparticle thin film containing the iron oxide magnetic nanoparticle powder of claim 1.

6. The iron oxide magnetic nanoparticle thin film and according to claim 5, further containing SiO$_2$.

7. A method of producing an iron oxide magnetic nanoparticle powder having $\epsilon$-Fe$_2$O$_3$ single phase, an average particle size from 5.2 nm, to 10.6 nm, and a variation of the particle size from 1.7 nm to 3.3 nm, wherein $\beta$-FeO(OH) nanoparticles are coated with silicon oxide, and thereafter the $\beta$-FeO(OH) nanoparticles coated with the silicon oxide are subjected to heat treatment in an oxidizing atmosphere.

8. The method of producing the iron oxide magnetic nanoparticle powder according to claim 7, wherein an atmospheric air is used as the oxidizing atmosphere.

9. The method of producing the iron oxide magnetic nanoparticle powder according to claim 7, wherein particles having an average particle size of 15 nm or less are used as the β-FeO(OH) nanoparticles.

10. A method of producing an iron oxide magnetic nanoparticle thin film containing iron oxide magnetic nanoparticles having an ε-$Fe_2O_3$ single phase, an average particle size from 5.2 nm, to 10.6 nm, and a variation of the particle size from 1.7 nm to 3.3 nm,
  wherein the iron oxide magnetic nanoparticle thin film is obtained by coating a surface of a substrate with a dispersion liquid containing β-FeO(OH) nanoparticles coated with silicon oxide, and thereafter applying heat treatment thereto in an oxidizing atmosphere.

11. The method of producing the iron oxide magnetic nanoparticle thin film according to claim 10, wherein an atmospheric air is used as the oxidizing atmosphere.

* * * * *